United States Patent [19]

Svensson et al.

[11] Patent Number: 4,924,996

[45] Date of Patent: May 15, 1990

[54] METHOD FOR POSITIONING A NUMBER OF WORKING IMPLEMENTS RELATIVE TO A CAR BODY

[75] Inventors: Dick L. Svensson, Nacka; Claes-Erik Söderman, Saltsjöbaden, both of Sweden

[73] Assignee: Atlas Copco Aktiebolag, Nacka, Sweden

[21] Appl. No.: 380,901

[22] Filed: Jul. 17, 1989

Related U.S. Application Data

[62] Division of Ser. No. 254,493, Oct. 6, 1988, Pat. No. 4,870,921.

[30] Foreign Application Priority Data

Oct. 7, 1987 [SE] Sweden ................................ 8703858

[51] Int. Cl.[5] ................................ B65G 43/00

[52] U.S. Cl. ................................ 198/341; 198/345; 414/225; 29/430; 29/712; 29/824; 134/45; 134/123

[58] Field of Search ................ 198/341, 345; 414/222, 414/225, 226; 118/313, 317, 326, 676, 695, 696; 29/430, 468, 709, 711, 712, 791, 822-824; 134/45, 123

[56] References Cited

U.S. PATENT DOCUMENTS

| | | | |
|---|---|---|---|
| 3,279,421 | 10/1966 | Tilney et al. . | |
| 4,179,021 | 12/1979 | Wallace | 198/341 |
| 4,290,383 | 9/1981 | Pfender . | |
| 4,311,112 | 1/1982 | Siebeneichen | 118/317 |
| 4,658,501 | 4/1987 | Fujii et al. | 29/824 |
| 4,718,439 | 1/1988 | Gorra et al. . | |
| 4,723,356 | 2/1988 | Sakamoto et al. | 198/341 |
| 4,734,979 | 4/1988 | Sakamoto et al. | 29/430 |
| 4,738,022 | 4/1988 | Sakamoto et al. | 29/711 |
| 4,811,685 | 3/1989 | Murai . | |
| 4,813,529 | 3/1989 | Kawai et al. | 414/226 |
| 4,827,598 | 5/1989 | Sakamoto et al. | 29/711 |
| 4,841,632 | 6/1989 | Namiki et al. | 29/823 |

FOREIGN PATENT DOCUMENTS

| | | | |
|---|---|---|---|
| 3150476 | 6/1983 | Fed. Rep. of Germany | 29/824 |
| 3334047 | 2/1985 | Fed. Rep. of Germany . | |

*Primary Examiner*—Joseph E. Valenza
*Attorney, Agent, or Firm*—Frishauf, Holtz, Goodman & Woodward

[57] ABSTRACT

A method for positioning a number of working implements, for example spray nozzles, to certain working or treatment points on a car body as the latter is supported by an overhead conveyor for travel between different working and assembly stations on a production line. A vertically movable base structure is provided and a working implement carrying frame is movably supported on the base structure. Hydraulic jacks on the base structure are arranged to accomplish a vertical parallel movement of the frame up toward the underside of the car body until one of four contact sensors indicates contact with the latter. A final vertical adjustment of the frame is accomplished by four vertical cylinders which raise the frame in a non-parallel movement until at least three of the four contact sensors indicate contact with the car body. The docking of the frame to the car body is completed by activating two expandable dowels which are introduced into openings in the car body bottom shell. Thereby, the frame is arrested relative to the car body and the spray nozzles are activated to perform the intended treatment of the car body.

4 Claims, 5 Drawing Sheets

METHOD FOR POSITIONING A NUMBER OF WORKING IMPLEMENTS RELATIVE TO A CAR BODY

This is a division of application Ser. No. 07,254,493 filed Oct. 6, 1988, now U.S. Pat. No. 4,870,921, issued Oct. 5, 1989.

BACKGROUND OF THE INVENTION

This invention relates to a method for positioning a number of working implements, such as spray nozzles, screw joint tightening tools, spot welding electrodes, etc, relative to certain working or treatment points on a car body as the latter is supported by an overhead conveyor for travel between different working and assembly stations on a production line. The technique comprises a vertically movable base structure and a working implement carrying frame movably supported on the base structure.

In DE No. 33 34 047 there is disclosed a car body anticorrosion treatment device of the above type. According to this prior art equipment, the car body to be treated is positioned relative to a nozzle carrying frame by means of a number of conical dowels which are raised up against the car body to engage apertures in the latter. To make the car body centralize properly on the dowels it is lifted up by the latters such that it separates at least to some extent from the conveyor.

This known device is particularly adapted to production lines having floor mounted conveyors. However, in factories having overhead conveyors from which the car bodies hang down during their travel between the different working and assembly stations there will be a problem if using a device of this known type, because if the car body to be treated were lifted up it would temporarily loose its support on the conveyor, and when lowered down again after treatment there is a risk that the car body will come into disalignment with the conveyor. Thereby, the car body would loose its proper orientation when heading for the next station on the line.

The invention intends to solve the above problem and is characterized by the features stated in the claims.

DETAILED DESCRIPTION

Figure 1:
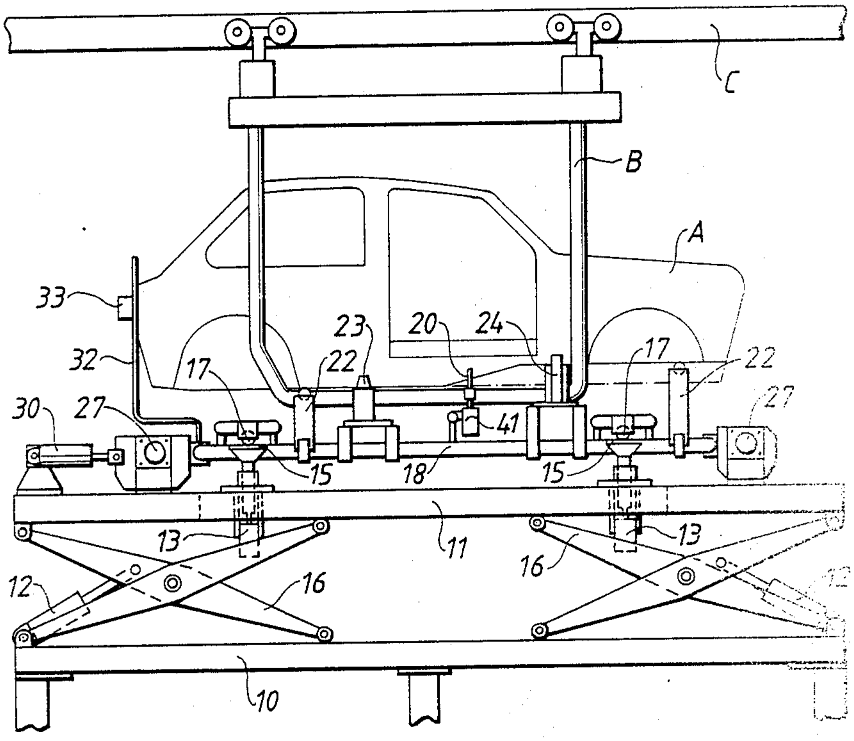
FIG. 1 is a side elevation of a device for carrying out the method according to the invention, the device being raised up against a car body to be treated.
Figure 2:
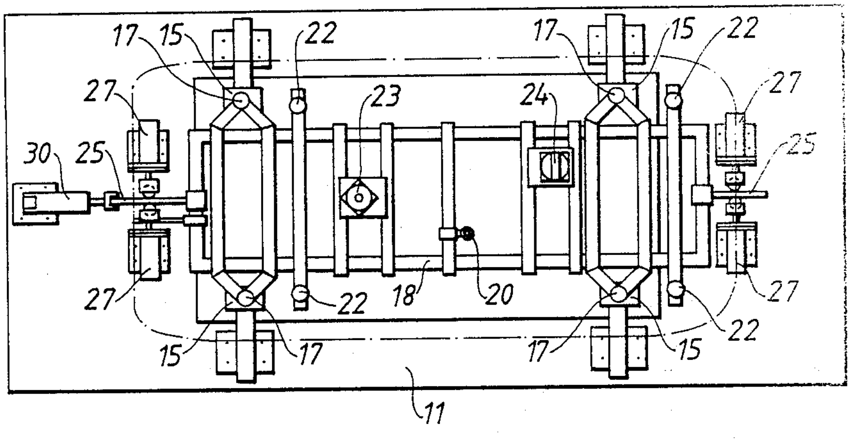
FIG. 2 shows a horizontal view of the device in FIG. 1.

The device illustrated in FIGS. 1 and 2 is basically intended for several different car body working or treatment applications but has in this particular embodiment been provided with spray nozzles for surface treatment. In particular, this device is intended for anticorrosion treatment by spray coating with protective oil, wax etc. of the inside surfaces of cavities of car bodies.

The shown device comprises a base structure which consists of a fixed under structure 10 and a vertically movable table 11. The latter is raised or lowered by hydraulic jacks 12 acting on cross linked levers 16. On the table 11 there is mounted four hydraulic vertically directed cylinders 13 each connected to a vertical support leg 14. The latter is displaceably guided by four rollers 21.

On top of each support leg 14 there is mounted a platform 15 with a flat horizontal bearing surface 15*a*. The latters form bearings together with balls 17 which are associated with a frame 18. This frame 18 carries a number of spray nozzles 20 for treatment of the car body A which is supported by a hookshaped hanger 8 movable on an overhead ceiling-mounted conveyor C. For clarity reasons, one spray nozzle 20 only is shown in FIGS. 1 and 2. Twenty to thirty nozzles are actually carried on the frame 18. The spray nozzles 20 and their mountings on the frame 18 will be further described below.

Apart from the bearing balls 17 and the spray nozzles 20, the frame 18 is provided with four sensing units 22 for sensing the vertical position on the frame 18 in relation to the car body, and two expandable dowel units 23, 24 for engagement with apertures in the car body under shell.

At both ends, the frame 18 is provided with flat centralizing arms 25 on which two pairs of oppositely directed hydraulic cylinders 27 act. The latters are mounted on the table 11. One of the centralizing arms 25 is connected to a hydraulic piston-cylinder device 30 for longitudinal movement of the frame 18 relative to the table 11. On the frame 18 there is also mounted a sensing lever 32 which gives an indication of the longitudinal position of the car body. This lever 32 carries an induction sensor 33 for sensing the steel car body.

Figure 4:
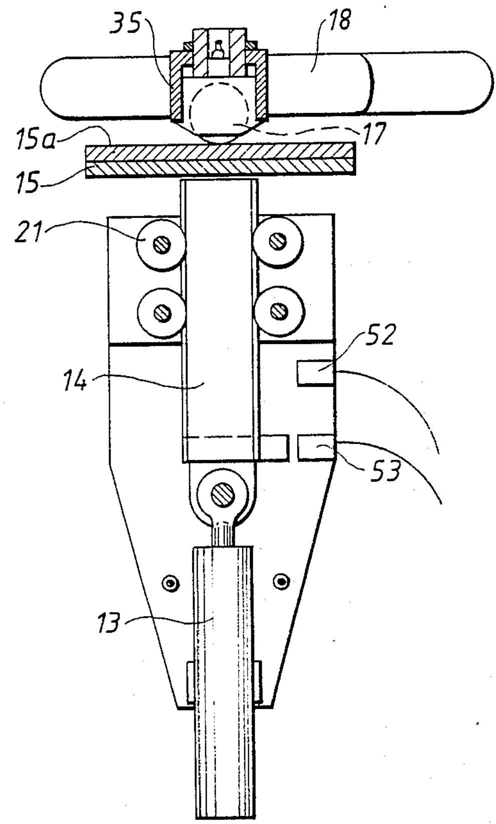
FIG. 4 shows on a larger scale and partly in section an adjustable support leg and a ball bearing of the working implement carrying frame.

Each of the support legs 14 is connected at its lower end to the adjustment cylinder 13. See FIG. 4. As mentioned above, there is a horizontal platform 15 mounted on top of the leg 14 to form a bearing means together with a steel ball 17. The latter is journalled in a spherical socket 35 on the frame 18 and provides for a low friction movement of the frame 18 in the horizontal plane relative to the table 11. The movement of the frame 18, though, is limited to the horizontal extension of the surfaces 15*a* of the platforms 15. The vertical position of the support leg 14 is indicated by signals produced by sensors 52, 53.

Figure 5:
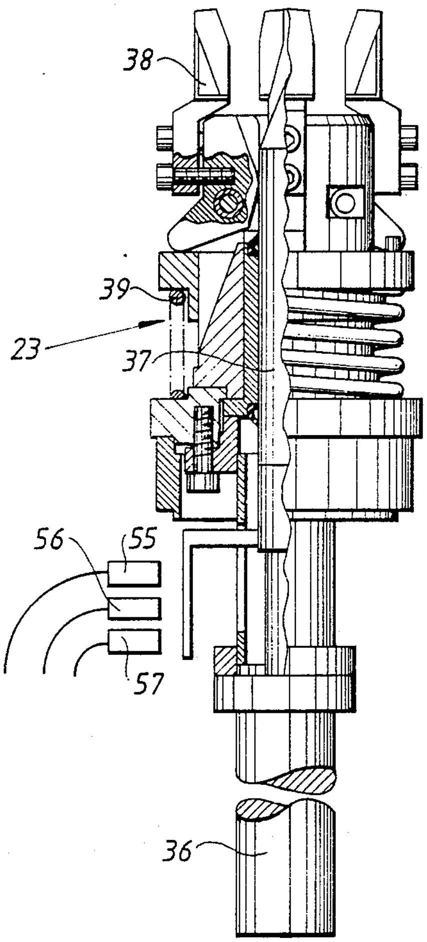
FIGS. 5 and 6 show partly in section two different positions of an expandable dowel.
Figure 6:
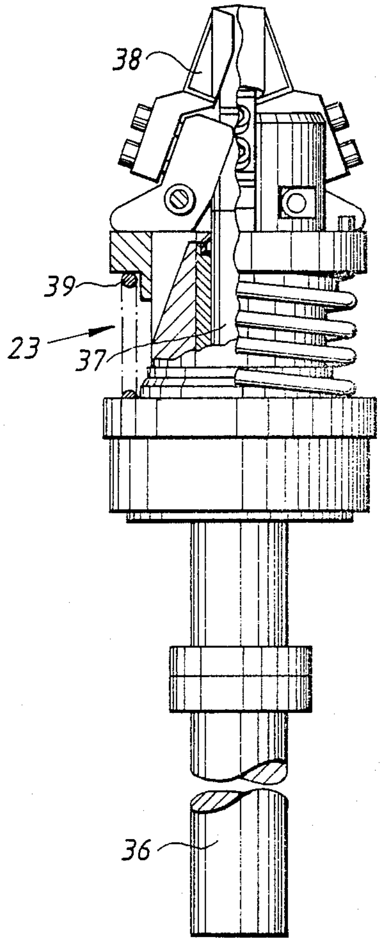

As illustrated in FIGS. 5 and 6, each of the expandable dowel units 23, 24 comprises a hydraulic cylinder 36, an activation rod 37 axially shiftable by the cylinder 36, and four pivotally mounted fingers 38 shifted to their outer frame 18 arresting positions by an upward movement of the activation rod 37. The dowel unit 23 further comprises a compression spring 39 acting on the fingers 38 to shift the latters back to their dowel forming positions, see FIG. 6, as the cylinder 36 is depressurized and the activation rod 37 is retracted. Sensors 55, 56, 57 deliver signals in response to the axial position of the activation rod 37.

Figure 7:
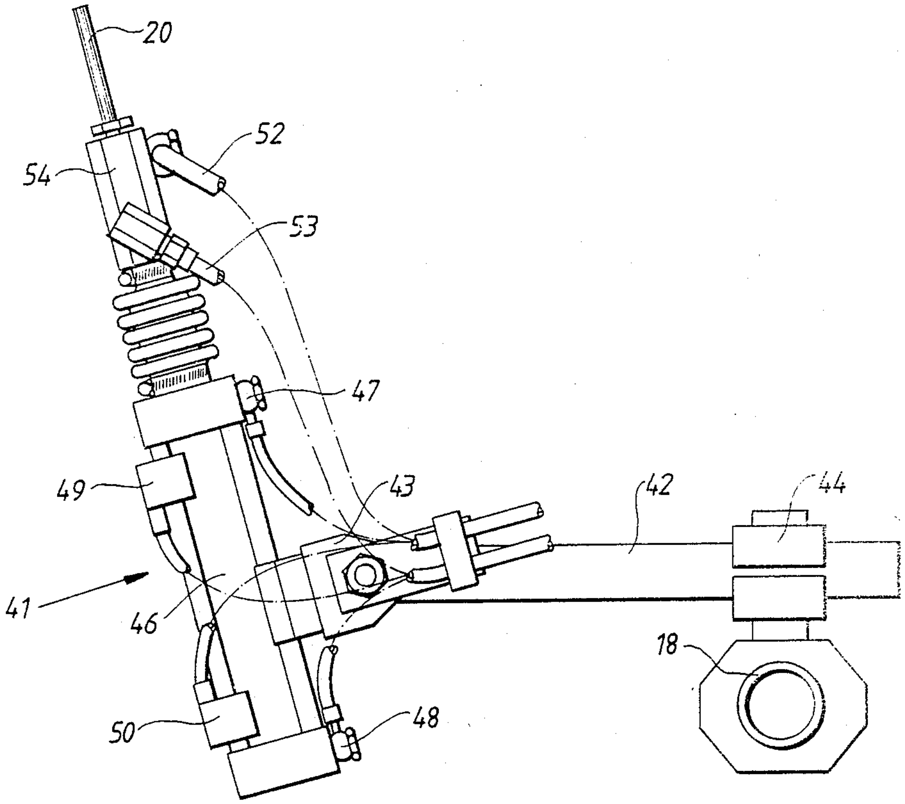
FIG. 7 shows a detail view of an injection nozzle and the mounting means thereof.

In FIG. 7 there is shown one of the spray nozzles 20 carried by the frame 18 as well as the mounting means and an activating unit 41 supporting the nozzle 20. The mounting means comprises an arm 42 with an articulated end piece 43 for connection to the activating unit 41. The arm 42 is of a cylindrical shape and is retained by a clamp 44. The latter provides for a universal adjustability of the arm 42 as well as an attachment to the frame 18.

The activating unit 41 comprises a pneumatic cylinder 46 for longitudinal displacement of the nozzle 20 into or out of an injection opening in the car body. The cylinder 46 has two service connections 47, 48 for alternative supply and drainage of pressure air and two position sensing elements 49, 50 for producing signals in response to the piston inside the cylinder 45 occupying either of its two end positions. Since the piston is rigidly interconnected with the nozzle 20, the position of the piston corresponds directly to the position of the nozzle 20. The piston rod is enclosed by a protective gaiter 51.

The injection nozzle 20 is supplied with coating material through a conduit 52 and pressure air through a conduit 53. Both conduits are connected to a mixing block 54.

Figure 3:
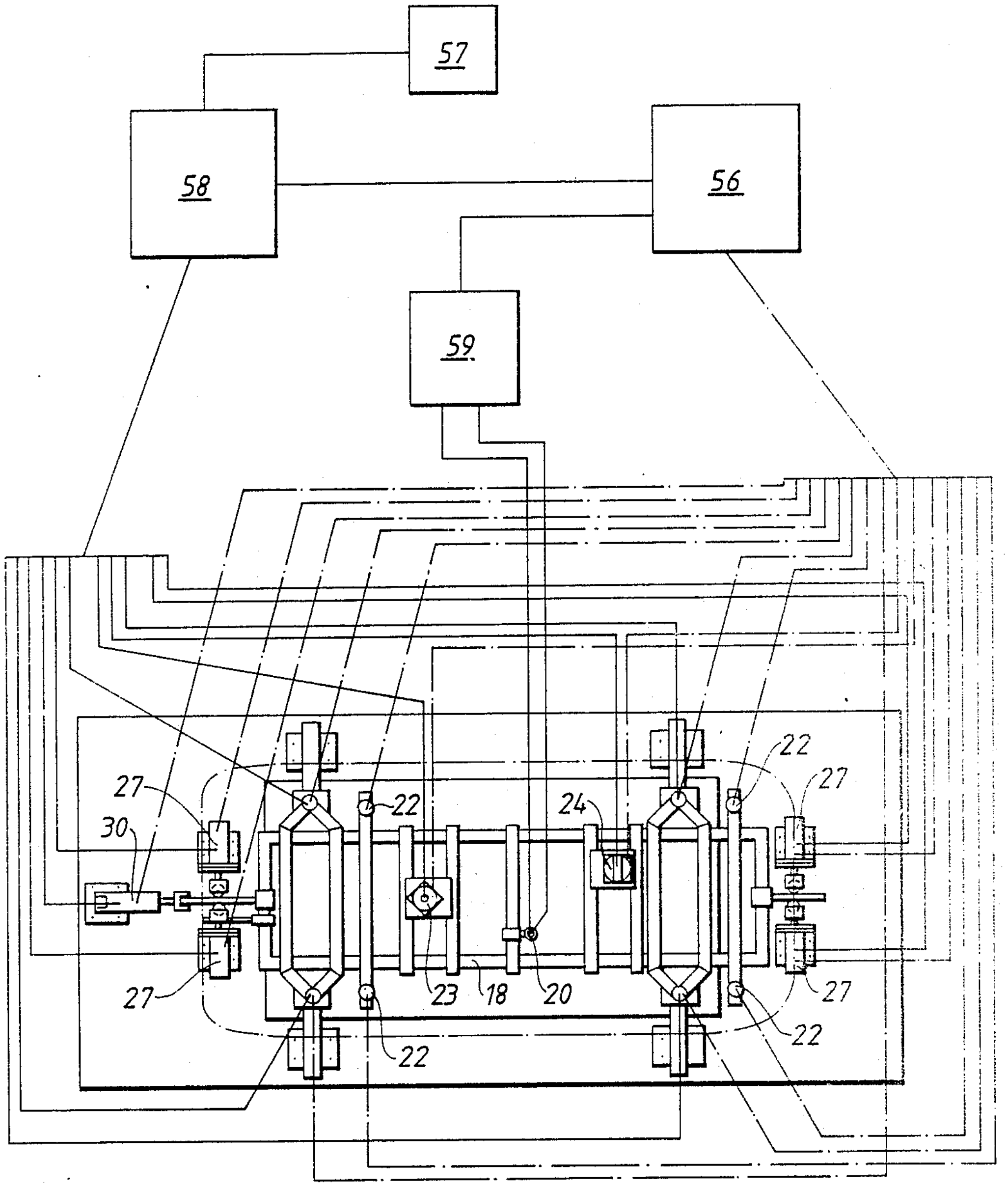
FIG. 3 shows schematically the control system of the positioning device in FIGS. 1 and 2.

As being illustrated in FIG. 3, the positioning device comprises a control system including a computer unit 56, a hydraulic power unit 57 and a pack of control valves 58. The device also comprises a coating material supply system 59.

The control system 56 is arranged to initiate activations of the various hydraulic cylinders 12, 13, 27, 30, arresting devices 23, 24 and injection nozzle units 41 by delivering signals to the respective control valves 58 and coating material supply system 59 in accordance with the program installed in the computer unit 56 and in relation to feed back signals received form the position sensing means associated with the activated units.

All cylinders, arresting devices and injection nozzle units are provided with sensors for producing feed back signals to the control system computer in response to activation being completed. This is not described in detail, because it is just common control technique and does not form part of the invention.

In operation, the positioning device according to the invention starts its positioning cycle as a car body has arrived in the working or treatment station and a confirmation signal has been received by the computer unit 56. The positioning cycle starts with the sensing lever 32 being raised and the frame 18 being displaced longitudinally by activation of the cylinder 30 until a signal is delivered by sensor 33 telling the computer unit 56 that the longitudinal position of the frame 18 is satisfactory for the continued positioning cycle.

During this longitudinal displacement of the frame 18, the four cylinders 27, 28 are all activated to engage the centralizing arms 25 and, thereby, keep the frame 18 in a central position. The longitudinal movement is quite short, and the frame 18 is supported by the steel balls 17 which roll on the bearing surface 15*a* of the platforms 15.

As this preliminary horizontal positioning is completed, the sensing lever 32 is moved back to its rest position and a vertical positioning of the frame 18 relative to the car body starts. In a first step, the frame 18 is raised relative to the under structure 10 in a parallel movement by activation of the jacks 12 and lifting of the table 11. This movement continues until one of the four sensing units 22 abuts the car body and delivers a signal to the computer unit 56 that so is the case. Then, the raising of the table 11 is interrupted.

During this vertical movement of the table 11, the dowels 23, 24 have entered openings (not shown) in the car body bottom shell, and when, according to the computer program the centralizing cylinders 27 are retracted to free the frame 18 and the longitudinal cylinder 30 is made free to move, a partial expansion of the dowels 23, 24, for example to 75% of their maximum expansion range, is effected. Thereby, a slight horizontal adjustment of the frame 18 relative to the car body is obtained. During this movement the balls 17 roll on the bearing surfaces 15*a*.

After having received signals from the dowels 23, 24 that the partial expansion of the latters is completed, the control unit 56 initiates a non-parallel vertical movement of the frame 18 by activating the four cylinders 13. Each of these cylinders 13 has an individual setting of the maximum pressure in order not to cause lifting of the car body as the sensing units 22 abuts the latter. The vertical movement is interrupted as at least three of the four sensing units 22 indicate contact with the car body. Now, the frame 18 occupies a position which is parallel to the car body bottom shell, and by expanding the dowels 23, 24 to their fully expanded positions, i.e. the fingers 38 being pivoted to their outmost positions by cylinder 36 and activation rod 37, a final horizontal adjustment as well as dead locking of the frame 18 relative to the car body is accomplished. The injection nozzle carrying frame 18 is docked relative to the car body and the intended surface treatment may start.

The spray coating of the internal surfaces of the cavities in the car body is commenced by the computer unit 56 giving order to the valve pack 58 and the coating material supply system 59 to activate the units 41 and, thereby, extend the nozzles 20 into the respective openings in the car body and to start supplying coating material and pressure air to the nozzles 20, respectively. The coating material supply system is set to deliver a specified amount of material to each nozzle. These amounts depend on the size and shape of the respective cavity to be treated.

The spray coating cycle ends with the retraction of the activation cylinders 41, deactivation of the arresting dowels 23, 24 and lowering of the frame 18 by contraction both of the four vertical cylinders 13 and the table raising cylinders 12. When feed back signals regarding these activities have been received by the computer unit 56, the latter gives an O.K. signal to the conveyor system to move the treated car body out of the treatment station and to move another car body into the station. The above described positioning and treatment cycle may then be repeated.

We claim:

1. Method for positioning a number of working implements relative to certain working or treatment points to a conveyor supported car body, wherein the working implements are carried on a frame (18) which is movably supported on a base structure (10, 11), comprising:

moving in a first step said frame (18) longitudinally in a horizontal plane to place said frame (18) in a preliminary horizontal position relative to the car body, moving in a second step said frame (18) into a preliminary vertical position by effecting a parallel vertical displacement of said frame (18) toward the underside of the car body by raising said base structure (10, 11)

aligning in a third step said frame (18) relative to the car body by moving said frame (18) vertically in a non-parallel movement relative to said base structure (10, 11), and arresting said frame (18) relative to the car body as said first, second and third steps are completed.

2. Method according to claim 1, wherein said step of arresting said frame (18) comprises a simultaneous horizontal position adjustment of said frame (18).

3. Method according to claim 1, wherein there are at least three car body contacting position sensing units (22) which are mounted on said frame (18) and responsive to vertical displacement of said frame relative to the car body; said second positioning step being discontinued when one only of said at least three sensing units (22) abuts the car body; and said third positioning step being discontinued when at least three of said at least three sensing units (22) abut simultaneously the car body.

4. Method according to claim 2, wherein there are at least three car body contacting position sensing units (22) which are mounted on said frame (18) and responsive to vertical displacement of said frame relative to the car body; said second positioning step being discontinued when one only of said at least three sensing units (22) abuts the car body; and said third positioning step being discontinued when at least three of said at least three sensing units (22) abut simultaneously the car body.

* * * * *